US012739567B2

(12) United States Patent
Zhong et al.

(10) Patent No.: US 12,739,567 B2
(45) Date of Patent: Sep. 15, 2026

(54) SPEAKER

(71) Applicant: AAC Microtech (Changzhou) Co., Ltd., Changzhou City (CN)

(72) Inventors: Zhiwei Zhong, Changzhou (CN); Xin Jin, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 108 days.

(21) Appl. No.: 19/007,597

(22) Filed: Jan. 2, 2025

(65) Prior Publication Data

US 2025/0380090 A1 Dec. 11, 2025

Related U.S. Application Data

(63) Continuation of application No. PCT/CN2024/097987, filed on Jun. 7, 2024.

(51) Int. Cl.

| | |
|---|---|
| ***H04R 9/06*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.
CPC ............... *H04R 9/025* (2013.01); *H04R 7/04* (2013.01); *H04R 7/18* (2013.01); *H04R 9/045* (2013.01); *H04R 9/06* (2013.01); *H04R 2209/024* (2013.01); *H04R 2400/11* (2013.01)

(58) Field of Classification Search
CPC . H04R 7/04; H04R 7/18; H04R 9/025; H04R 9/045; H04R 9/06; H04R 2209/024; H04R 2400/11
See application file for complete search history.

(56) References Cited

U.S. PATENT DOCUMENTS

2016/0225362 A1* 8/2016 Xu .......................... H04R 9/045
2020/0053470 A1* 2/2020 Gu ........................ H04R 1/2811
2025/0301255 A1* 9/2025 Ren ......................... H04R 9/025

* cited by examiner

*Primary Examiner* — Huyen D Le
(74) *Attorney, Agent, or Firm* — Wiersch Law Group

(57) ABSTRACT

The present application provides a speaker. The magnetic circuit system of the speaker includes a lower clamping plate fixed to a base frame, a center magnetic circuit fixed to the lower clamping plate, and a side magnetic circuit provided around the center magnetic circuit to form a magnetic gap. The side magnetic circuit includes two symmetrically spaced first side magnetic units; each first side magnetic unit includes a first side magnet, a first side pole core, and a second side magnet. The first side magnet and/or the second side magnet include a first main body and a first projection, and a first grooving is formed by the first body portion and the first projection, so that an occupied space for the side magnets can be reduced, which allows for maximizing the volume of the magnet while fully utilizing the vibration space to enhance magnetic force.

10 Claims, 8 Drawing Sheets

B-B

SPEAKER

CROSS-REFERENCE TO RELATED APPLICATIONS

This application is a continuation of International Application No. PCT/CN2024/097987, Jun. 7, 2024, the entire contents of which is incorporated herein by reference.

TECHNICAL FIELD

The present application relates to the field of electroacoustic conversion technologies, in particular to a speaker.

BACKGROUND

In recent years, with the rapid development of information technology, the prevalence of audio devices has been increasing. People's demands for audio devices are no longer limited to the playback of audio and video but have extended to higher reliability requirements. With the advent of the 3G era, mobile multimedia technology has also advanced, and many audio devices now offer various entertainment functions, such as video playback, digital photography, gaming, and GPS navigation. These functions require electronic components within audio devices to become increasingly sophisticated and compact. In audio devices, miniature sound-producing components are commonly used electronic components for audio signal playback, and their structural design directly affects the audio playback quality.

The speaker in the related art includes a vibration system and a magnetic circuit system. In magnetic circuit systems with a central magnet and side magnets, the side magnets are often of regular shapes, such as flat and strip-shaped, which occupy a significant amount of space. This design is not conducive to providing sufficient vibration space for optimizing the performance of the speaker.

Therefore, it is necessary to provide a new speaker.

SUMMARY

The purpose of the present application is to provide a speaker that can solve the problem that the existing side magnets take up a large space, which is not conducive to providing sufficient vibration space to optimize the performance of the speaker.

The technical solution of the present application is as follows: provided is a speaker including:

- a base frame;
- a vibration system fixed to the base frame; and
- a magnetic circuit system configured to drive the vibration system to vibrate and generate sound, including:
  - a lower clamping plate fixed to the base frame;
  - a center magnetic circuit fixed to the lower clamping plate; and
  - a side magnetic circuit provided around the center magnetic circuit and spaced apart from the center magnetic circuit to form a magnetic gap;
- wherein the side magnetic circuit includes two symmetrically spaced first side magnetic units; each of the first side magnetic units includes a first side magnet fixed to the lower clamping plate, a first side pole core provided on a side of the first side magnet away from the lower clamping plate, and a second side magnet provided on a side of the first side pole core away from the first side magnet; the first side magnet and/or the second side magnet include a first main body and a first projection extending from the first main body along a direction away from the center magnetic circuit, and a first grooving is formed by the first body portion and the first projection.

In one embodiment, when the first side magnet and the second side magnet both include the first body portion and the first projection, the first projection of the first side magnet is affixed to the lower clamping plate and a length of the first body portion of the first side magnet is greater than or equal to a length of the first side pole core; the first projection of the second side magnet is affixed to the first side pole core and a length of the first projection of the second side magnet is less than or equal to the length of the first side pole core.

In one embodiment, the side magnetic circuit further includes two symmetrically spaced second side magnetic units; each of the second side magnetic units includes a third side magnet fixed to the lower clamping plate, a second side pole core provided on a side of the third side magnet away from the lower clamping plate, and a fourth side magnet provided on a side of the second side pole core away from the third side magnet; the third side magnet includes a second main body and a second projection extending from the second main body along a direction away from the center magnetic circuit; a second grooving is formed by the second main body and the second projection, and a third grooving is formed by the second side pole core and the fourth side magnet.

In one embodiment, the second projection of the third side magnet is affixed to the lower clamping plate and a length of the second main body is greater than or equal to a length of the second side pole core.

In one embodiment, the base frame is rectangular in shape, two of the first side magnetic units are provided spaced apart along a short axis direction, and two of the second side magnetic units are provided spaced apart along a long axis direction.

In one embodiment, the center magnetic circuit includes a first center magnet fixed to the lower clamping plate, a center pole core provided on a side of the first center magnet away from the lower clamping plate, and a second center magnet provided on a side of the center pole core away from the first center magnet.

In one embodiment, the magnetic circuit system further includes an upper clamping plate provided opposite the lower clamping plate; the upper clamping plate includes a clamping plate body portion and an extension portion; the extension portion is provided around the clamping plate body portion, the clamping plate body portion is fixed to the center magnetic circuit, and the extension portion is fixed to the side magnetic circuit.

In one embodiment, the vibration system includes a first diaphragm fixed to the base frame, a former fixed to the first diaphragm, a voice coil fixed to the former and inserted in the magnetic gap, a second diaphragm, a first connecting member connecting the former and the second diaphragm, and a second connecting member connecting the second diaphragm and the upper clamping plate.

In one embodiment, the vibration system further includes a flexible member fixed to the base frame and connected to the former.

In one embodiment, the former includes a former body portion spaced apart from the first diaphragm, a holding portion bent from the former body portion toward the first diaphragm and fixed to the first diaphragm, and a support portion symmetrically provided around a periphery of the voice coil and configured to support the voice coil; the support portion and the holding portion enclose to form a first cavity for accommodating the first side magnetic unit and a second cavity for accommodating the second side magnetic unit; and the former body portion, the holding portion, and the support portion enclose to form a third cavity for accommodating the center magnetic circuit.

The beneficial effect of the present application is that the magnetic circuit system includes a lower clamping plate fixed to the base frame, a center magnetic circuit fixed to the lower clamping plate, and a side magnetic circuit provided around the center magnetic circuit and spaced apart from the center magnetic circuit to form a magnetic gap. The side magnetic circuit includes two symmetrically spaced first side magnetic units; each of the first side magnetic units includes a first side magnet fixed to the lower clamping plate, a first side magnet provided on a side of the first side magnet away from the lower clamping plate, and a second side magnet provided on a side of the first side pole core away from the first side magnet. The first side magnet and/or the second side magnet includes a first main body and a first projection extending from the first body portion along a direction far away from the central magnetic circuit, and a first grooving is formed by the first main body and the first projection, which helps to reduce the space occupied by the side magnets, thereby increasing the vibration space for the vibration system. This allows for maximizing the volume of the magnet while fully utilizing the vibration space to enhance magnetic force, thereby improving the acoustic performance of the speaker.

DETAILED DESCRIPTION OF THE EMBODIMENTS

The present application is further described below in connection with the accompanying drawings and embodiments.

Figure 1:
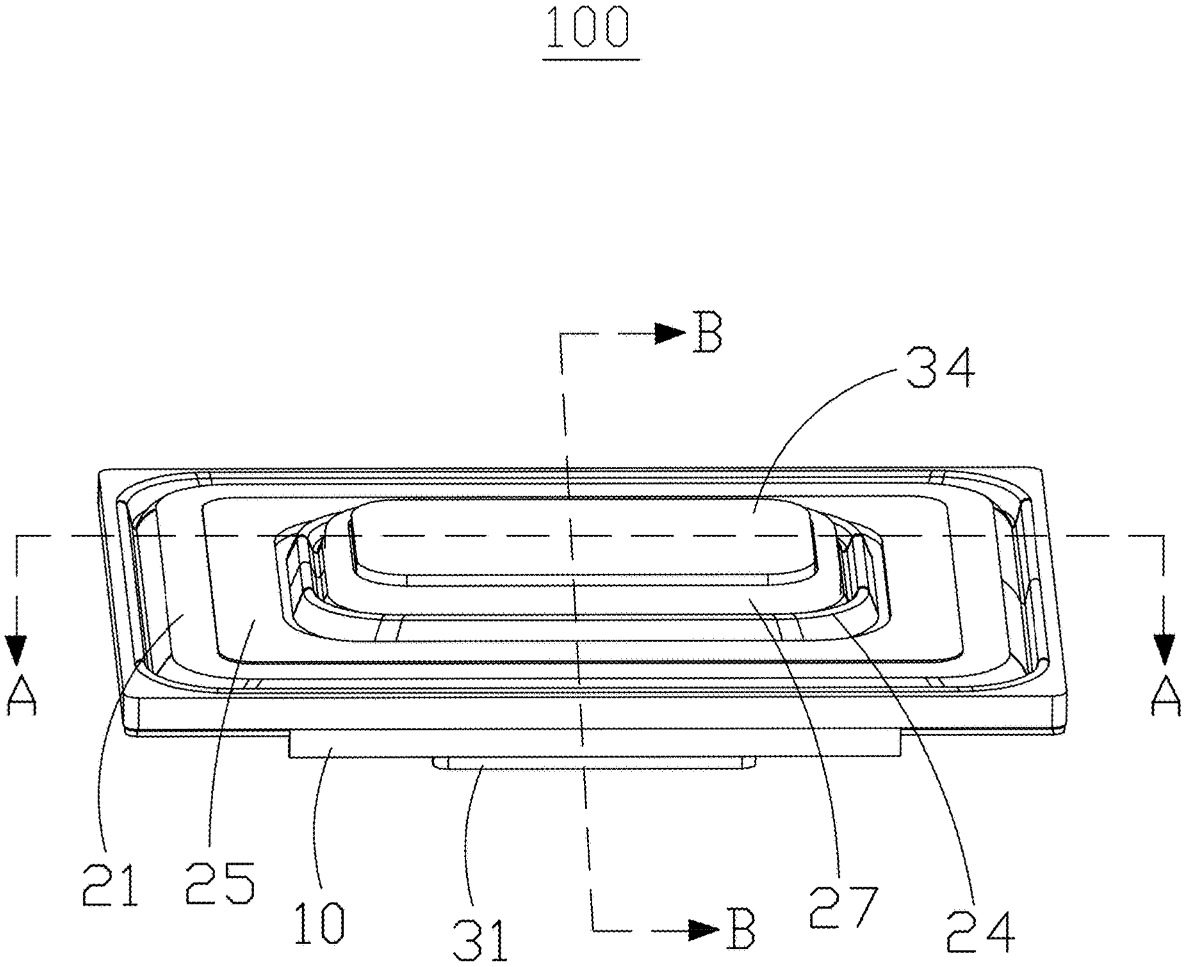
FIG. 1 shows a three-dimensional structural schematic diagram of a speaker according to an embodiment of the present application.
Figure 2:
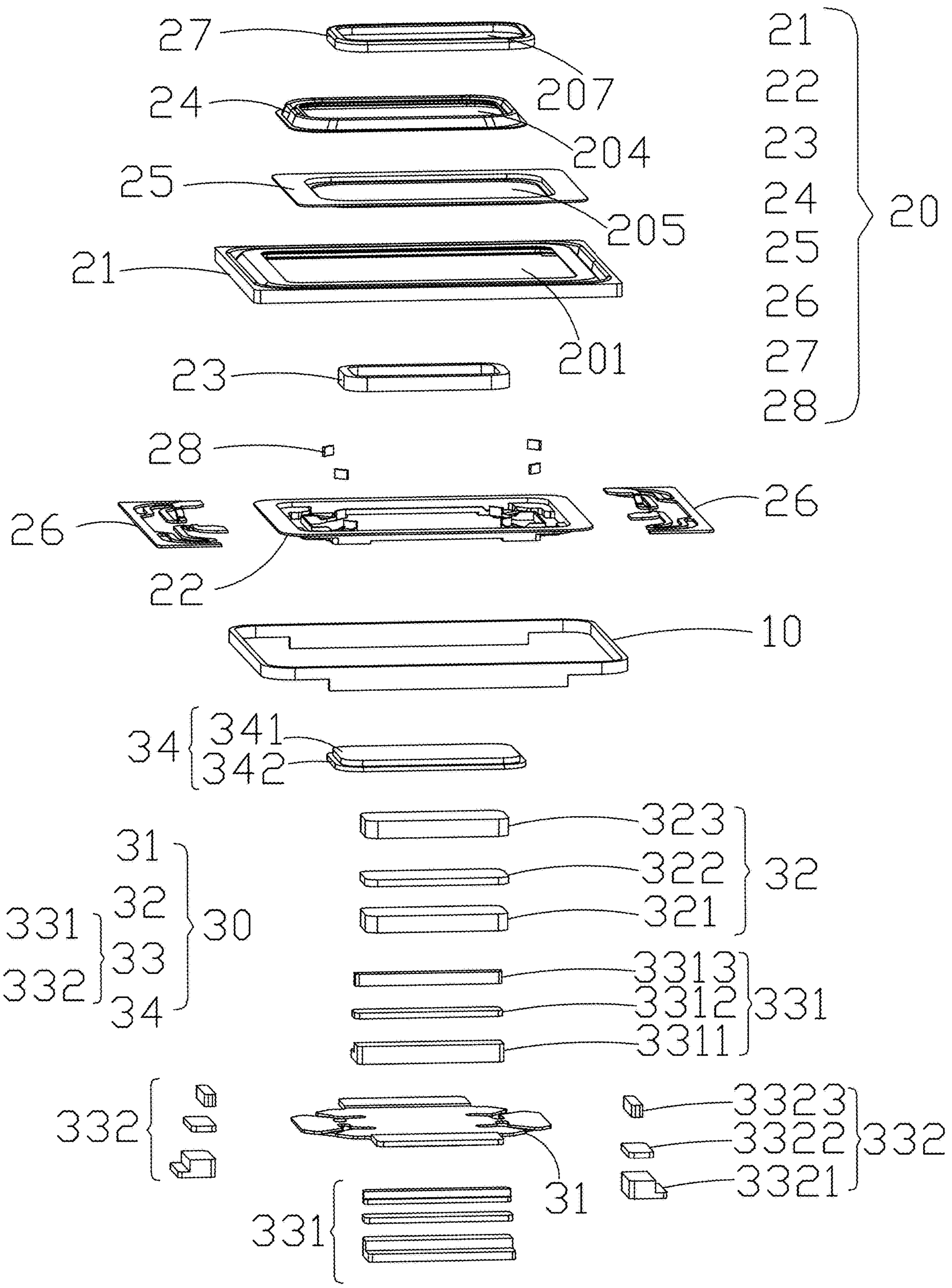
FIG. 2 shows an exploded view of the speaker according to an embodiment of the present application.
Figure 3:
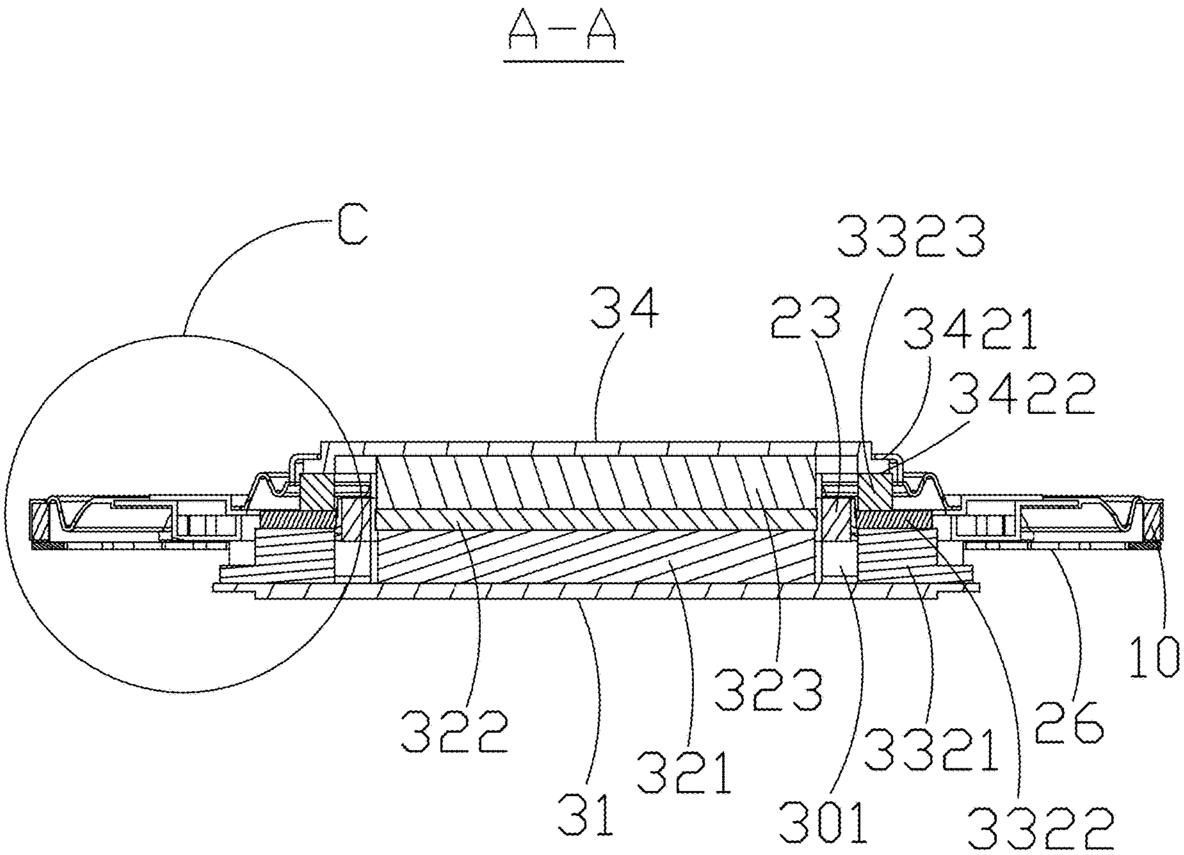
FIG. 3 shows a sectional view of the speaker in FIG. 1, taken along the line A-A.

As shown in FIGS. 1-3, the speaker 100 of an embodiment of the present application includes a base frame 10, a vibration system 20, and a magnetic circuit system 30.

The base frame 10 is configured to support the vibration system 20 and the magnetic circuit system 30. The magnetic circuit system 30 has a magnetic gap 301, and the magnetic circuit system 30 is configured to drive the vibration system 20 to vibrate and generate sound. In this embodiment, the base frame 10 is rectangular in shape.

As shown in FIGS. 2-3, the vibration system 20 includes a first diaphragm 21 fixed to the base frame 10, a former 22 fixed to the first diaphragm 21, a voice coil 23 fixed to the former 22 and inserted in the magnetic gap 301, a second diaphragm 24, a first connecting member 25 connecting the former 22 and the second diaphragm 24, and a second connecting member 27 connecting the second diaphragm 24. When the speaker 100 is powered on, the voice coil 23 vibrates under the action of the magnetic circuit system 30, thereby driving the first diaphragm 21 and the second diaphragm 24 to vibrate and generate sound.

Specifically, as shown in FIGS. 2-6, the first diaphragm 21 includes a first vibration portion 211, a first folded ring portion 212 that extends by bending from a circumference of the first vibration portion 211, a first fixing portion 213 that extends outwardly by bending from a side of the first folded ring portion 212 away from the first vibration portion 211, and a first through hole 201 arranged through the first vibration portion 211 along a vibration direction of the first diaphragm 21. The first fixing portion 213 is fixed to the base frame 10 and the first vibration portion 211 is fixed to the former 22. The first folded ring portion 212 is in an arcuate structure and projects toward a side of the magnetic circuit system 30.

Specifically, as shown in FIGS. 2-6, the second diaphragm 24 includes a second vibration portion 241, a second folded ring portion 242 that extends by bending from a circumference of the second vibration portion 241, a third folded ring portion 243 that extends by bending from the peripheral edge of the second folded ring portion 242, a second fixing portion 244 that extends outwardly from a side of the third folded ring portion 243 away from the second folded ring portion 242, and a second through hole 204 arranged through the second vibration portion 241 along a vibration direction of the second diaphragm 24. The second fixing portion 244 is fixed to the first connecting member 25, and the second vibrating portion 241 is fixed to the second connecting member 27. The second folded ring portion 242 and the third folded ring portion 243 are in an arcuate structure, and the second folded ring portion 242 and the third folded ring portion 243 are projected in opposite directions. Specifically, the second folded ring portion 242 projects toward the side of the magnetic circuit system 30, and the third folded ring portion 243 projects back toward the side of the magnetic circuit system 30.

As shown in FIG. 2, the first connecting member 25 is provided with a third through hole 205 arranged through the first connecting member 25 along the vibration direction, and the second connecting member 27 is provided with a fourth through hole 207 arranged through the second connecting member 27 along the vibration direction.

As shown in FIGS. 1, 2, 5, and 6, during assembly, the first connecting member 25 is capped at the first through hole 201, the second diaphragm 24 is capped at the third through hole 205, and the second connecting member 27 is capped at the second through hole 204.

Figure 7:
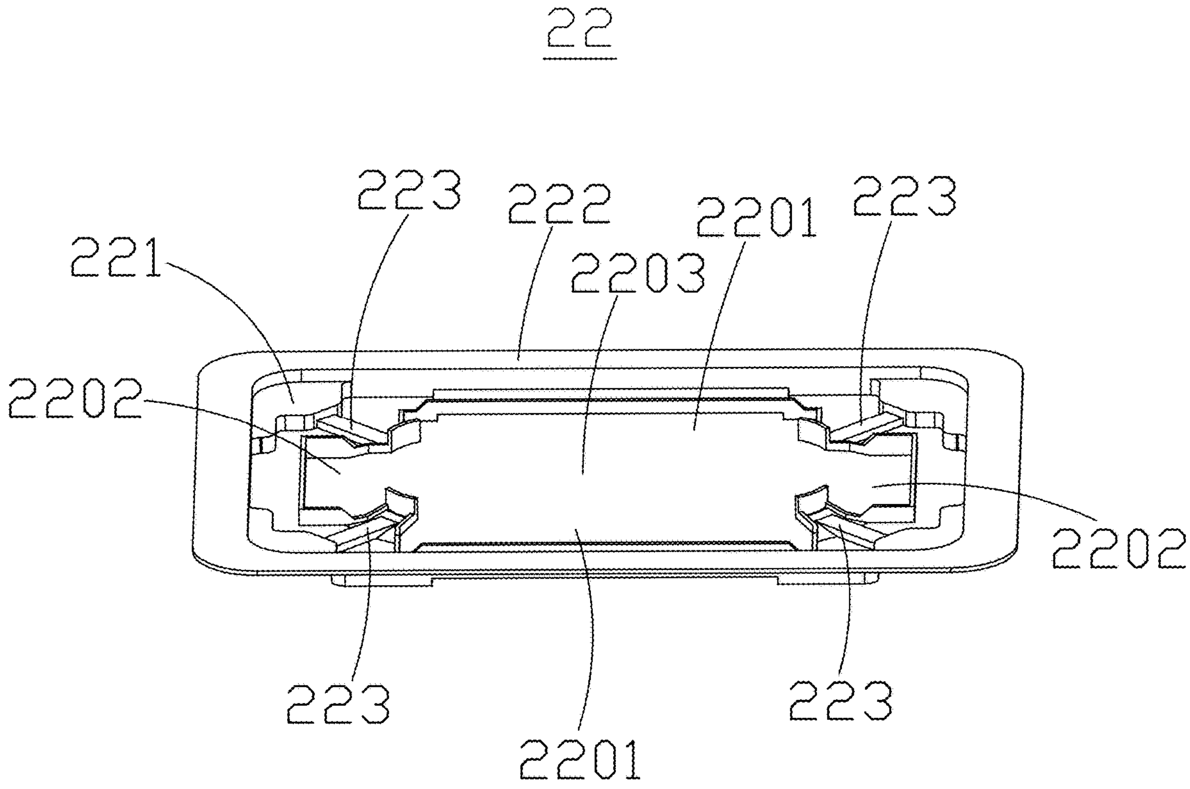
FIG. 7 shows a structural schematic diagram of a former according to an embodiment of the present application.

As shown in FIG. 7, the former 22 includes a former body portion 221 spaced apart from the first diaphragm 21, a holding portion 222 that extends and bends from the former body portion 221 toward the first diaphragm 21 and fixed to the first diaphragm 21, and a support portion 223 symmetrically provided around the peripheral side of the voice coil 23 and configured support the voice coil 23. The support portion 223 and the holding portion 222 enclose to form the first cavity 2201 and the second cavity 2202. The holding portion 222, and the support portion 223 enclose to form a third cavity 2203.

In this embodiment, the voice coil 23 is in the form of a rectangular structure with rounded corners, and the former 22 is rectangular in shape. There are four support portions 223, which are distributed at the four corners of the former 22 and fixed at the rounded corners of each of the voice coils 23 to support the voice coils 23. The first cavity 2201 extends along the long-axis direction, and the second cavity 2202 extends along the short-axis direction.

Further, as shown in FIG. 2, the support portion 223 supports the voice coil 23 by means of the cushioning member 28, avoiding friction between the support portion 223 and the voice coil 23 and damaging the voice coil 23.

Further, as shown in FIG. 2, the vibration system 20 also includes a flexible member 26 fixed to the base frame 10 and connected to the former 22. There are two flexible members 26, which are located on opposite sides of the voice coil 23.

As shown in FIGS. 2-4, and 8, the magnetic circuit system 30 includes a lower clamping plate 31 fixed to the base frame 10, an upper clamping plate 34 provided opposite the lower clamping plate 31, a center magnetic circuit 32 fixed to the lower clamping plate 31, and side magnetic circuits 33 provided around the center magnetic circuit 32 and spaced apart from the center magnetic circuit 32 to form a magnetic gap 301.

The lower clamping plate 31 may be configured to conduct the magnetism and improve the driving force. The lower clamping plate 31 fixes the center magnetic circuit 32 and the side magnetic circuit 33, and the side magnetic circuit 33 is provided around the circumference of the center magnetic circuit 32.

Figure 4:
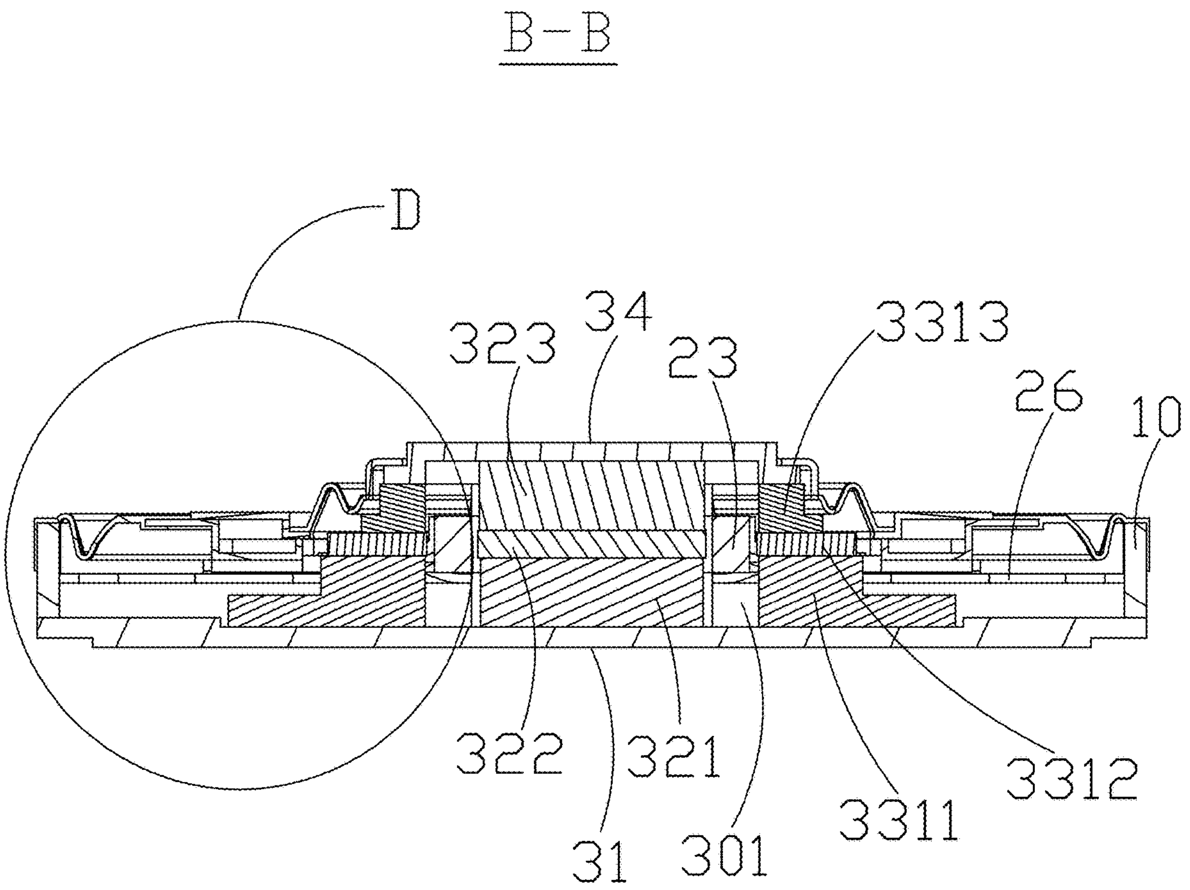
FIG. 4 shows a sectional view of the speaker in FIG. 1, taken along the line B-B.

As shown in FIGS. 2-4, the upper clamping plate 34 includes an upper clamping plate body portion 341 and an extension portion 342. The extension portion 342 is provided around the upper clamping plate body portion 341, and the extension portion 342 includes a first surface 3421 and a second surface 3422 that are oppositely provided. The second connecting member 27 is fixed to the first surface 3421. The upper clamping plate 34 is capped at the fourth through hole 207, so that the clamping plate body portion 341 is fixed to the center magnetic circuit 32 and the extension portion 342 is fixed to the side magnetic circuit 33.

Figure 8:
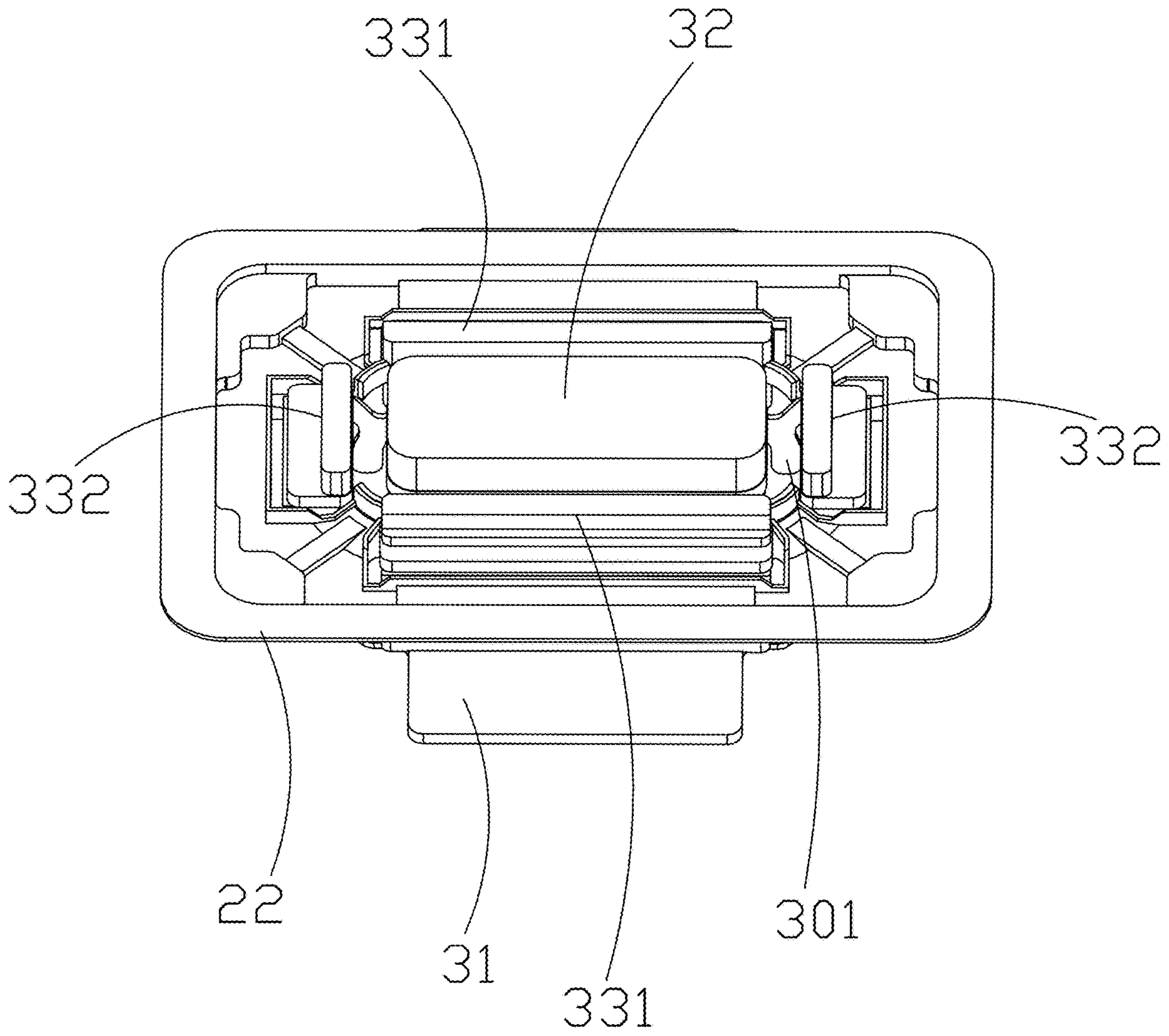
FIG. 8 shows a schematic diagram of the assembly structure of a magnetic circuit system and the former according to an embodiment of the present application.

As shown in FIGS. 3, 4, and 8, the center magnetic circuit 32 is accommodated in the third cavity 2203. The center magnetic circuit 32 includes a first center magnet 321 fixed to the lower clamping plate 31, a center pole core 322 provided on a side of the first center magnet 321 away from the lower clamping plate 31, and a second center magnet 323 provided on a side of the center pole core 322 away from the first center magnet 321. The second center magnet 323 is fixed to the upper clamping plate body portion 341.

As shown in FIGS. 2-4, and 8, the side magnetic circuit 33 includes two symmetrically spaced first side magnetic units 331 and two symmetrically spaced second side magnetic units 332. The two first side magnetic units 331 are spaced apart from each other along a short-axis direction, and the two second side magnetic units 332 are spaced apart from each other along a long-axis direction. Specifically, as shown in FIG. 8, the first side magnetic units 331 are accommodated in the first cavity 2201 and the second side magnetic units 332 are accommodated in the second cavity 2202. The first side magnetic units 331 and the second side magnetic units 332 are fixed to the second surface 3422 of the extension portion 342.

Figure 6:
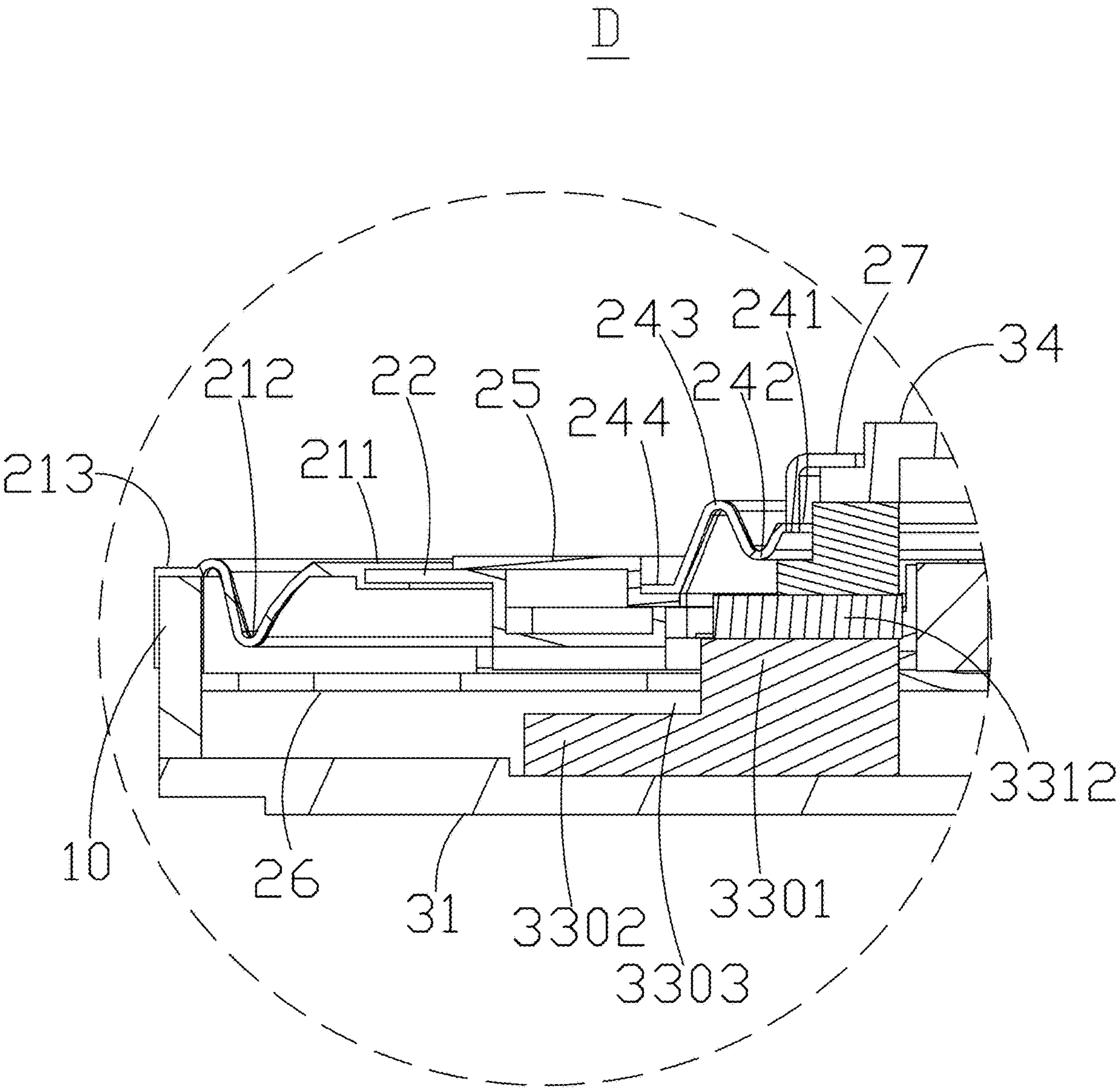
FIG. 6 is a schematic diagram showing a partially enlarged view of the structure in region D of FIG. 4.

Specifically, as shown in FIGS. 4 and 6, the first side magnetic unit 331 includes a first side magnet 3311 fixed to the lower clamping plate 31, a first side pole core 3312 provided on a side of the first side magnet 3311 away from the lower clamping plate 31, and a second side magnet 3313 provided on a side of the first side pole core 3312 away from the first side magnet 3311. The first side magnet 3311 and/or the second side magnet 3313 include a first main body 3301 and a first projection 3302 extending from the first main body 3301 along a direction away from the center magnetic circuit 32, and a first grooving 3303 is formed by the first main body 3301 and the first projection 3302. It should be understood that the first side magnet 3311 and/or the second side magnet 3313 are in an L-shaped design. As an embodiment, the first side magnet 3311 is in an L-shaped design. As an embodiment, the second side magnet 3313 is in an L-shaped design. As an embodiment, both the first side magnet 3311 and the second side magnet 3313 are in an L-shaped design. In this embodiment, the first side magnet 3311 and the second side magnet 3313 are both of L-type design, which can reduce the occupied space of the side magnets, thereby increasing the vibration space of the vibration system 20. This allows for maximizing the volume of the magnet while fully utilizing the vibration space to enhance magnetic force, thereby improving the acoustic performance of the speaker 100.

When the first side magnet 3311 and the second side magnet 3313 both include the first main body 3301 and the first projection 3302, the first projection 3302 of the first side magnet 3311 is affixed to the lower clamping plate 31 and the length of the first main body 3301 of the first side magnet 3311 is greater than or equal to the length of the first side pole core 3312. The first projection 3302 of the second side magnet 3313 is affixed to the first side core 3312 and the length of the second side magnet 3313 is greater than or equal to the length of the first side pole core 3312. In this setting method, the first side pole core 3312 supports the second side magnet 3313, and the second side magnet 3313 is fixed to the second surface 3422 of the extension portion 342, which can improve the structural stability of the first side magnetic unit 331.

Figure 5:
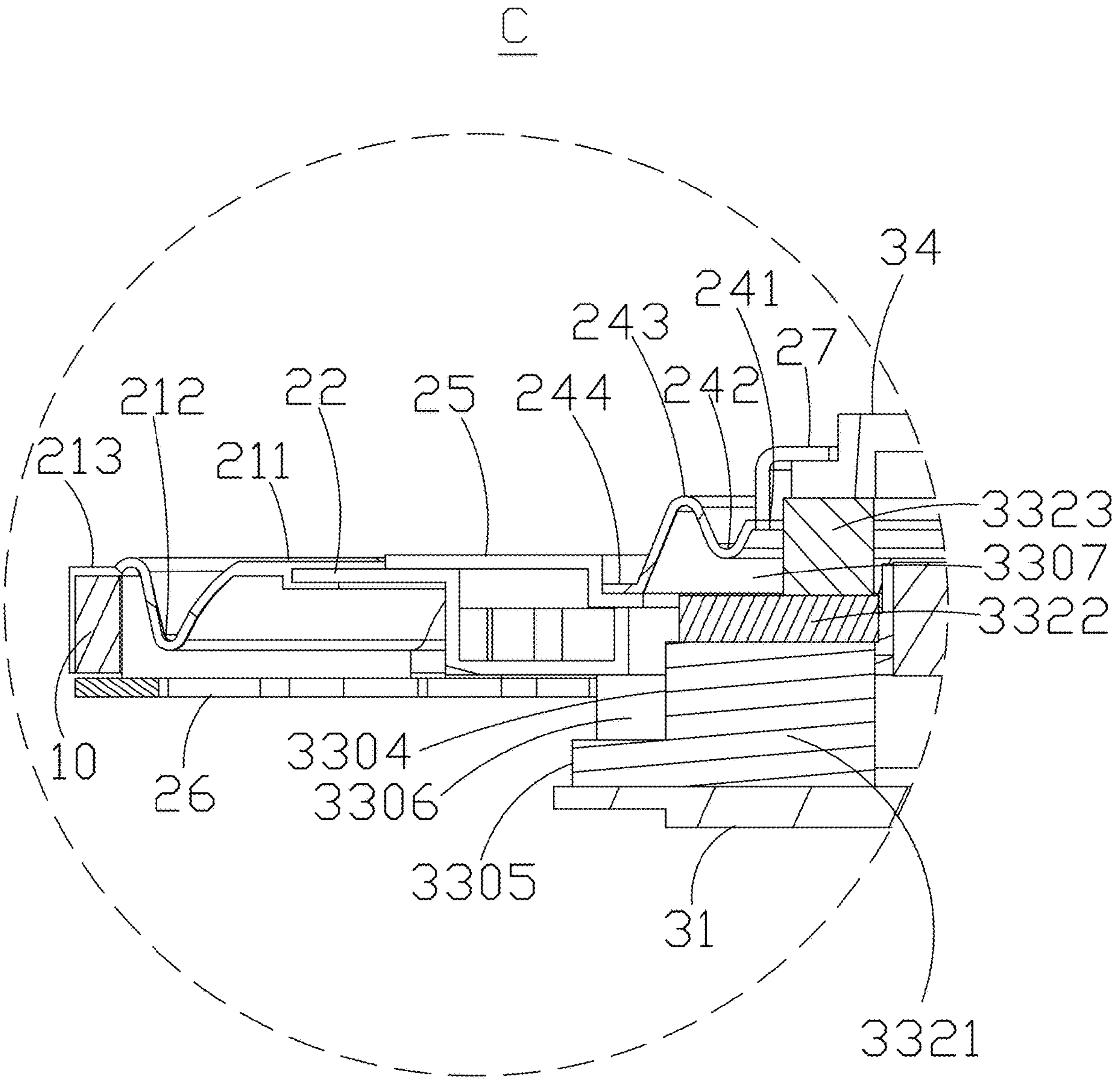
FIG. 5 is a schematic diagram showing a partially enlarged view of the structure in region C of FIG. 3.

Specifically, as shown in FIGS. 3 and 5, the second side magnetic unit 332 includes a third side magnet 3321 fixed to the lower clamping plate 31, a second side pole core 3322 provided on the side of the third side magnet 3321 away from the lower clamping plate 31, and a fourth side magnet 3323 provided on a side of the second side pole core 3322 away from the third side magnet 3321. The third side magnet 3321 includes a second main body 3304 and a second projection 3305 extending from the second main body 3304 along a direction away from the center magnetic circuit 32. A second grooving 3306 is formed by the second main body 3304 and the second projection 3305, and a third grooving 3307 is formed by the second side pole core 3322 and the fourth side magnetic steel 3323. In this embodiment, the third side magnetic steel 3321 is in an L-shape design, and the layout structures of the second side pole core 3322 and the fourth side magnet 3323 are also in an L-shaped design, which can reduce the occupied space of the side magnet, thereby increasing the vibration space of the vibration system 20. This allows for maximizing the volume of the magnet while fully utilizing the vibration space to enhance magnetic force, thereby improving the acoustic performance of the speaker 100.

Further, the second projection 3305 of the third side magnet 3321 is affixed to the lower clamping plate 31 and the length of the second main body 3304 is greater than or equal to the length of the second side pole core 3322. The second side pole core 3322 supports the fourth side magnet 3323, and the fourth side magnet 3323 is fixed to the second surface 3422 of the extension portion 342, which can improve the structural stability of the second side magnetic unit 332.

Described above are only embodiments of the present application, and it should be pointed out that, for the ordinary technical personnel in the field, improvements may also be made without departing from the inventive conception of the present application, but these are all within the protection scope of the present application.

What is claimed is:

1. A speaker comprising:

a base frame;

a vibration system fixed to the base frame; and a magnetic circuit system configured to drive the vibration system to vibrate and generate sound, comprising:

a lower clamping plate fixed to the base frame;

a center magnetic circuit fixed to the lower clamping plate; and a side magnetic circuit provided around the center magnetic circuit and spaced apart from the center magnetic circuit to form a magnetic gap;

wherein the side magnetic circuit comprises two symmetrically spaced first side magnetic units; each of the first side magnetic units comprises a first side magnet fixed to the lower clamping plate, a first side pole core provided on a side of the first side magnet away from the lower clamping plate, and a second side magnet provided on a side of the first side pole core away from the first side magnet; the first side magnet and/or the second side magnet comprise a first main body and a first projection extending from the first main body along a direction away from the center magnetic circuit, and a first grooving is formed by the first main body and the first projection.

2. The speaker of claim 1, wherein when the first side magnet and the second side magnet both comprise the first main body and the first projection, the first projection of the first side magnet is affixed to the lower clamping plate and a length of the first main body of the first side magnet is greater than or equal to a length of the first side pole core; the first projection of the second side magnet is affixed to the first side pole core and a length of the first projection of the second side magnet is less than or equal to the length of the first side pole core.

3. The speaker of claim 1, wherein the side magnetic circuit further comprises two symmetrically spaced second side magnetic units; each of the second side magnetic units comprises a third side magnet fixed to the lower clamping plate, a second side pole core provided on a side of the third side magnet away from the lower clamping plate, and a fourth side magnet provided on a side of the second side pole core away from the third side magnet; the third side magnet comprises a second main body and a second projection extending from the second main body along a direction away from the center magnetic circuit; a second grooving is formed by the second main body and the second projection, and a third grooving is formed by the second side pole core and the fourth side magnet.

4. The speaker of claim 3, wherein the second projection of the third side magnet is affixed to the lower clamping plate and a length of the second main body is greater than or equal to a length of the second side pole core.

5. The speaker of claim 3, wherein the base frame is rectangular in shape, two of the first side magnetic units are provided spaced apart along a short axis direction, and two of the second side magnetic units are provided spaced apart along a long axis direction.

6. The speaker of claim 1, wherein the center magnetic circuit comprises a first center magnet fixed to the lower clamping plate, a center pole core provided on a side of the first center magnet away from the lower clamping plate, and a second center magnet provided on a side of the center pole core away from the first center magnet.

7. The speaker of claim 1, wherein the magnetic circuit system further comprises an upper clamping plate provided opposite the lower clamping plate; the upper clamping plate comprises a clamping plate body portion and an extension portion; the extension portion is provided around the clamping plate body portion, the clamping plate body portion is fixed to the center magnetic circuit, and the extension portion is fixed to the side magnetic circuit.

8. The speaker of claim 7, wherein the vibration system comprises a first diaphragm fixed to the base frame, a former fixed to the first diaphragm, a voice coil fixed to the former and inserted in the magnetic gap, a second diaphragm, a first connecting member connecting the former and the second diaphragm, and a second connecting member connecting the second diaphragm and the upper clamping plate.

9. The speaker of claim 8, wherein the vibration system further comprises a flexible member fixed to the base frame and connected to the former.

10. The speaker of claim 8, wherein the former comprises a former body portion spaced apart from the first diaphragm, a holding portion bent from the former body portion toward the first diaphragm and fixed to the first diaphragm, and a support portion symmetrically provided around a periphery of the voice coil and configured to support the voice coil; the support portion and the holding portion enclose to form a first cavity for accommodating the first side magnetic unit and a second cavity for accommodating the second side magnetic unit; and the former body portion, the holding portion, and the support portion enclose to form a third cavity for accommodating the center magnetic circuit.

* * * * *